May 9, 1967     A. J. VAN NOORD     3,317,970
SEAT BELT BUCKLE
Filed Sept. 4, 1964
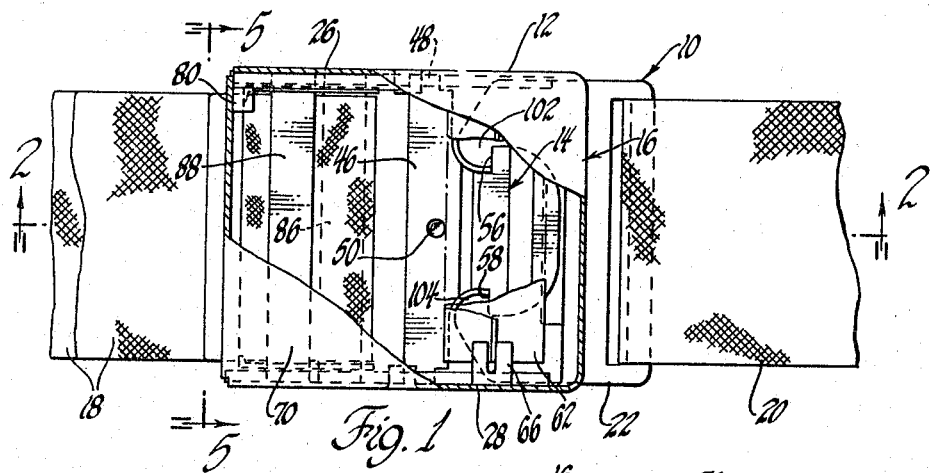
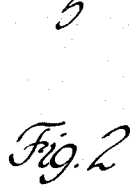
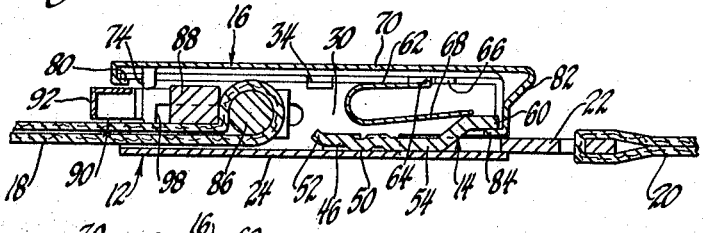
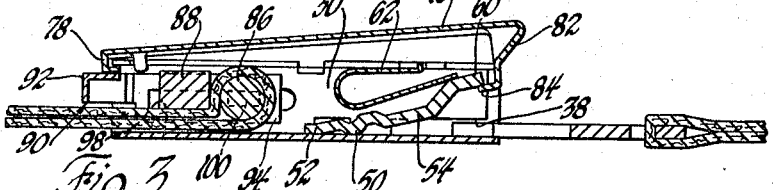
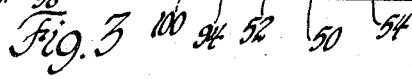
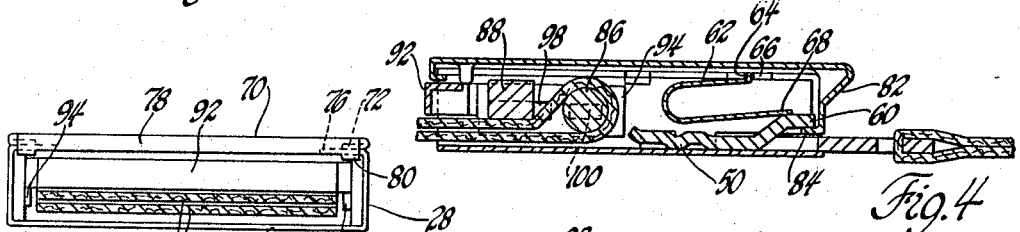
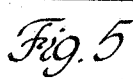
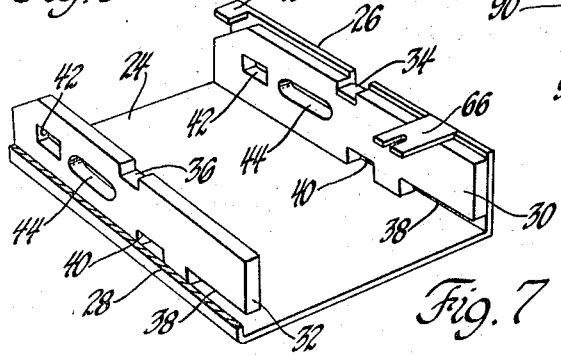
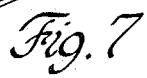
INVENTOR.
Andrew J. VanNoord
BY
Dale A. Winnie
ATTORNEY

United States Patent Office 3,317,970
Patented May 9, 1967

3,317,970
SEAT BELT BUCKLE
Andrew J. Van Noord, Grand Rapids, Mich., assignor to Kent Engineering, Grand Rapids, Mich., a partnership
Filed Sept. 4, 1964, Ser. No. 394,452
3 Claims. (Cl. 24—75)

This invention relates to safety seat belt straps and buckles in general, and more particularly to means for engaging the ends of a pair of safety seat belt straps or the like together.

Numerous different means for engaging and holding safety seat belt straps together have been proposed, produced, and used. Generally, they include a buckle or housing provided on the end of one safety seat belt strap and having a latching mechanism for engaging the end of another safety seat belt strap thereto. One of the seat belt straps is usually of a fixed length and the other is adjustable either in the housing or on the member engaged with the latching mechanism.

The housing of most safety seat belt buckles is the principal strength bearing member between the two seat belt straps. Forces are transmitted from one strap to the other through the latching mechanism and the housing part.

The consequence of using the housing of a seat belt buckle as a strength member is that it must be strong and also capable of being made ornamentally attractive. In most instances, this has meant a casting or a heavy gauge material of reasonably good quality so that it can be finished, coated, or otherwise treated to improve its appearance.

One of the objects of this invention is to provide other strength bearing means in a seat belt buckle besides the housing so that the housing may be made of less expensive material and material which can be more readily made attractive.

In this respect, it is an object of this invention to provide a pair of strength bearing side rail members within a wrap around housing and to have the seat belt straps engaged to means which are engaged to the side rail members rather than the housing.

Another problem of the conventionally known safety seat belt arrangement is providing means for retaining the latching mechanism in the housing without having parts exposed through the side walls. This usually requires channel ways, grooves, blind slots and the like which are difficult and costly to machine or otherwise provide.

These problems are obviated by the present invention in having the side rail members include whatever openings and slots are necessary to locate and retain internal parts and in having the side walls of the wrap around housing cover them on the outside.

Still another problem of safety seat belt buckles is the exposure of the adjustment bar. The side wall exposure when in a buckle is unattractive and subject to unintentional actuation sometimes. Clothes may also be caught in the exposed ends of the adjustment means unless they are carefully designed and even more carefully manipulated.

The present invention avoids the adjustment bar problem by teaching the use of means in the housing and exposed through one of the open ends of the housing in a very simple manner.

These and other objects and advantages to be gained in the practice of this invention will be better understood and more fully appreciated upon a reading of the following specification and with reference to the accompanying drawing.

in the drawing:

FIGURE 1 is a top plan view of a seat belt buckle embodying the features of this invention and having certain exterior parts broken away to better show other parts thereof.

FIGURE 2 is a cross sectional view of a seat belt buckle of the first drawing figure as seen in the plane of line 2—2 thereon and looking in the direction of the arrows.

FIGURE 3 is a view of the seat belt buckle similar to the last mentioned drawing figure but in a different operative condition.

FIGURE 4 is similar to the last two mentioned drawing figures with the seat belt strap adjustment feature shown in a different operative position.

FIGURE 5 is an end view of the seat belt buckle shown by the first drawing figure as seen in the plane of line 5—5 thereon and looking in the direction of the arrows.

FIGURE 6 is a perspective view of a certain part of the seat belt structure of this invention.

FIGURE 7 is a perspective view of certain parts of the seat belt buckle of the previously mentioned drawing figures which are shown separately to enable a better description thereof.

Referring to the drawing figures in further detail, a safety seat belt buckle 10 is shown to include a housing 12 having a latching mechanism 14 provided therein and a cover 16 disposed thereover and adapted to actuate the latching mechanism. A seat belt strap 18 is received in one end of the housing 12 and is connected to the buckle by means provided therein and later described. A seat belt strap 20 is provided with a tongue member 22 which is received in the other end of the housing 12 for engagement with the latching mechanism 14.

The seat belt buckle housing 12 is formed to include a bottom wall 24 and vertically disposed upstanding side walls 26 and 28. The housing is open at opposite ends and across the top thereof. Within the housing are provided side rail members 30 and 32 (best shown in FIGURE 6). These are received next adjacent the housing side walls 26 and 28.

Since the side rail members are the same the description of one fits both and common reference numerals are used in describing them and in the accompanying drawing.

The side rail members 30 and 32 are held against fore and aft movement in the housing 12 by tabs 34 which are formed from the housing side walls 26 and 28 and are bent over and received in recesses 36 formed in the upper edges of the side rails. An undercut 38 is formed on the bottom leading edge of the side rails near the end thereof which receives the belt strap tongue 22. Another bottom edge opening 40 is provided between the ends of the side rail for the latching mechanism 14. Other openings 42 and 44 are provided in the side rails and serve to hold and allow adjustment of the seat belt strap 18 as will later be described.

The latching mechanism 14 is provided in the housing 12 near the forwardly disposed open end thereof. It includes a member having a back part 46 which extends across the housing, between the side rails 30 and 32, and has ends 48 which are formed to be received in the openings or recesses 40 in the bottom edges of the side rail members.

The back part 46 of the latching mechanism member rests on a protrusion 50 which serves as a fulcrum for pivoting the latch member as shown in FIGURE 3. With reference to this drawing figure, it will be noted that the end 52 of the latch part is bent up to avoid interference with the bottom wall of the housing in the pivotal actuation thereof. This up-turned terminal extension 52 also provides shoulder engagement on the back side of the latch receptive opening 40 in the side rail members.

The center section 54 of the latch member rests on the bottom wall 24 of the housing and is formed to include catch shoulders 56 and 58 in its outer disposed side edges. The terminal end 60 of the latch part is formed to stand in spaced relation over the bottom wall 24 of the housing for operative engagement with the cover 16, as later described.

A leaf spring 62 is provided in the housing 12 and extends substantially across the full width thereof. It is a reversely bent U-shaped member having an up-turned edge 64 provided at one end which is received in positioning means 66 formed and standing out from the housing side walls 26 and 28. The lower leg 68 of the leaf spring member is bent back and engaged with the upstanding end 60 of the latch member to hold the latch seated on the bottomwall of the housing with the back part thereof upon the pivot detent 50, substantially as shown by FIGURE 2.

The cover 16 for the housing 12 includes a top wall 70 which has the side edges 72 thereof bent down and turned under, as best shown by FIGURE 5. The inturned edges include downturned tabs 74, near the back edge, which are received just in front of in-turned tabs 76 formed from the housing side walls 26 and 28. The back edge 78 of the cover and the cover tabs 74 locate the cover fore and aft.

After assembly of the internal parts of the buckle in the housing 12, cover tabs 80 provided on the back edge 78, near the housing side walls, are crimped under to prevent the cover from being removed from the housing.

The front end of the cover 16 is turned down as at 82 and substantially closes the open end of the housing over which it extends. A lower terminal lip 84 on the downturned end is turned into the housing and is engaged to the underside of the terminal end 60 of the latch member.

Referring to FIGURES 2–4, in particular, it will be appreciated that the leaf spring 62 which holds the latch member down also serves to hold the cover 16 down and against rattling.

The seat belt strap 18, which is engaged to the seat belt buckle housing 12, is received in the rearwardly disposed open end of the housing and extends around an adjustment bar 86 provided therein.

The adjustment bar 86 extends across and between the side rail members 30 and 32 in the housing 12. It is a round bar and will be appreciated as being knurled and with flattened terminal ends, although not shown, which are received in the side rail slots 44.

The shouldered engagement of the adjustment bar 86, and the latch member part 46, with the side rails 30 and 32 will be appreciated as holding the side rail members in spaced relation to each other and against the housing side walls 24 and 26. As a consequence other means of holding the side walls to the housing side walls are not necessary.

The bar 86 around which the seat belt strap 18 extends is adjustable relative to a cross bar 88 provided in the housing 12. The latter is formed for shoulder engagement with the side rails 30 and 32, as the adjustment bar and latch are, and has terminal ends which are received in the openings 44 in the side rails. The ends of the cross bar 88, however, are fitted to the openings 42 and the bar is not adjustable but is rather relatively fixed therein.

When the adjustment bar 86 has the strap 18 wrapped around it and is pulled towards the bar 88, the strap 18 is engaged and held between the two and further adjustment of it on the knurled bar is precluded. This is best shown by a comparison of FIGURES 2 and 4.

Since the seat belt strap adjustment bar 86 is disposed within the housing 12, some means are needed to actuate it from outside the seat belt buckle housing. For this purpose, a push bar 90 is provided in the open end of the housing 12 through which the strap 18 extends. Push bar member 90 includes a cross piece 92 and a pair of forwardly disposed arms 94 and 96 which are received on the insides of the side rail members 30 and 32 and between them and the shoulders of the adjustment bar 86 and the fixed cross bar 88.

The push bar arms 94 and 96 are each formed to include slots 98 and 100 which are elongated for the cross bar 88 to extend therethrough and just the size for the ends of the adjustment bar 86 to be received therein. As a consequence, when the cross piece 92 is engaged and moved towards the housing 12, the arms are also moved and the adjustment bar 86 is backed away from the cross bar 88. This enables the belt 18 to be adjusted on the bar 86 as best shown in FIGURE 4.

When the push bar 90 is released, the adjustment bar 86 is pulled back towards the cross bar 88 and the belt is again held between the two.

The seat belt strap 20 is sewn together about a cross bar of the tongue 22. The tongue member is in turn engaged to the latch by catch shoulders 102 and 104 which are formed on the inside edges of its forked end and cooperate with the catch shoulders 56 and 58 of the latch member.

From the foregoing description, it will be appreciated that the housing 12 may be a simple wrap around part. It may be of plastic or any other material since it does not serve as a load transfer part between the seat belt straps 18 and 20. Instead, the load is carried through the side rails 30 and 32.

The housing 12 is made essentially as described with the side walls 26 and 28 turned up as shown. The side rail members 30 and 32 are spaced apart to receive the latch member part 46, the adjustment bar 86 and the cross bar 88 between them before they are received in the housing. The adjustment bar 86 and cross bar 88 are actually pre-assembled in the push bar part 90 first and then all three are received between the side rails. The side rail assembly is then positioned in the housing 12 between the housing side walls and the tabs 34 are crimped over to locate and hold the side rail members where they are supposed to be in the housing.

The leaf spring 62 is next. It is engaged between the latch member and the in-turned spring engaging tabs 66 from the housing side walls. The seat belt strap 18 should be wrapped around the bar 86 before assembly but it can be threaded around the adjustment bar at this time if it has not already been done.

The last essembly operation is to place the cover 16 on the housing 12. This requires that the forward end 82 have the terminal lip 84 engaged to the latch end 60 and the means provided near the back end engaged together to locate the cover laterally and longitudinally on the housing. The means 80 on the back corner edges of the cover are then crimped under to complete the assembly operation.

When the tongue member 22 is inserted in the housing 12, it actuates the latch by lifting it up, as in the position shown by FIGURE 3, against the resistance of the leaf spring 62 and until it moves into position for catch shoulder engagement therewith. The cover member 16 is normally not activated in this operation and is shown in the drawing as it is lifted to raise the latch and release the tongue member rather than as disposed for the operation first mentioned.

From the foregoing the teachings and scope of the present invention should be obvious.

Although a preferred form of this invention has been specifically shown and described, it is to be understood that this is done by way of example and without any intention to limit the invention. Such modifications and improvements as are within the spirit and scope of the present invention are to be considered as inclusive under the hereinafter appended claims.

I claim:
1. A safety seat belt buckle, comprising;
a housing having bottom and side walls,
a pair of separate and individual side rail members provided in said housing and disposed in parallel spaced relation to each other across said housing and next adjacent said side walls, and belt retaining means extended between said side rail members at opposite ends thereof and engaged thereto in said housing, said side rail members having load bearing strength and being formed to include captive openings for said belt retaining means, and said housing being formed for the retension of said side rail members and having the side walls thereof closing and obscuring said captive openings on the outside of said housing.

2. The safety seat belt buckle of claim 1, including;

a singular cover means closing said housing and hinged to said side walls at one end thereof, and said cover means extending the length of said housing and being formed at one end for operative engagement with one of said belt retaining means and the release thereof from said housing.

3. A safety seat belt buckle, comprising;

a wrap-around housing having a pair of side rail strength bearing members provided therein and extending fore and aft along opposite sides thereof, said housing being formed to retain said side rails relatively positioned therein and being open at opposite ends and across the top thereof, seat belt adjustment means engaged between said side rails at one end of said housing and seat belt latching means engaged between said side rails at the other end thereof, said adjustment means including a stop member and an adjustment bar movable relative to each other and means for actuating one thereof relative to the other for permitting the adjustment of a seat belt on said bar, said actuating means being guided on said side rails and being operative from outside said housing through said one housing end, and a singular cover member extending the full length of and closing the top of said housing and including an inbent lip for operation of said latching means.

References Cited by the Examiner

UNITED STATES PATENTS

| 2,143,126 | 1/1939 | Honogger | 24—196 |
| 2,862,268 | 12/1958 | Cushman | 24—75 |
| 2,972,173 | 2/1961 | Weber | 24—171 |

FOREIGN PATENTS 588,241  11/1933  Germany.

WILLIAM FELDMAN, *Primary Examiner.*

E. SIMONSEN, *Assistant Examiner.*